United States Patent [19]

Rupert

[11] 4,233,512
[45] Nov. 11, 1980

[54] THERMOMETER FOR REMOTELY MEASURING TEMPERATURE

[75] Inventor: Robert E. Rupert, South Dennis, Mass.

[73] Assignee: Norman C. Anderson, Chatham, Mass.

[21] Appl. No.: 947,391

[22] Filed: Oct. 2, 1978

[51] Int. Cl.³ .......................... G01J 1/00; G01K 1/00; H03B 5/30
[52] U.S. Cl. ................................ 250/338; 73/339 A; 73/355 R; 73/359 A; 250/351; 331/155
[58] Field of Search ....................... 250/338, 340, 351; 73/339 A, 355 R, 359 A; 331/25, 155, 158

[56] References Cited
U.S. PATENT DOCUMENTS

| | | | |
|---|---|---|---|
| 3,616,638 | 11/1971 | Bennett et al. | 331/25 |
| 3,925,668 | 12/1975 | Anderson et al. | 250/351 |
| 3,999,433 | 12/1976 | Taplin | 73/339 A |

Primary Examiner—Alfred E. Smith
Assistant Examiner—Janice A. Howell
Attorney, Agent, or Firm—Morse, Altman, Oates & Bello

[57] ABSTRACT

A thermometer is provided for remotely measuring the temperature of a heat source. The device utilizes an infrared sensor for detecting the temperature of a remote object and an output of the sensor is processed and used to drive a meter or other display device. An improved resonant circuit is provided for modulating the radiant energy impinging on the sensor to produce a pulsed output from the sensor. The modulating circuit includes a piezoelectric reed which deflects under an applied frequency and is located in the optical path of the system. The reed serves as an active element in an improved phase-locked loop used to drive and stabilize the optical chopper.

6 Claims, 7 Drawing Figures

THERMOMETER FOR REMOTELY MEASURING TEMPERATURE

BACKGROUND OF THE INVENTION

1. Field of the Invention

This invention relates generally to temperature measuring devices and more particularly is directed towards a new and improved device for measuring the temperature of a remote object and includes a novel resonant circuit.

2. Description of the Prior Art

In U.S. Pat. No. 3,925,668 there is disclosed a temperature measuring device adapted to sense and measure remotely the temperature of an object whereby an exact temperature may be taken without direct contact with the object. Such devices are useful as clinical thermometers, industrial applications and various consumer uses. In the above, radiant energy from the object being monitored is sensed by use of an aperture, optical filter, electro-mechanical modulator and a radiation sensor along with appropriate electronic circuitry and a temperature indicator output display. The modulator for the foregoing consists of a magnet, a moving coil and a vibrating needle disposed in the path of the radiation and adapted to change the radiation impinging upon the sensor from a steady state to a pulsed state.

The present invention has for one of its objects an improved temperature sensing device for remotely measuring the temperature of an object. Another object of this invention is to provide a novel resonant circuit useful for a variety of circuit applications, including that of providing a precise frequency of operation for an optical chopper of the sort used in the above thermometer.

SUMMARY OF THE INVENTION

This invention features a thermometer for making remote temperature measurements, comprising a temperature sensor element adapted to generate an electrical current proportional to radiation incident thereon. In order to render the output of the sensor more accurate the steady radiant energy from the source being measured is converted to a pulsed state by means of a piezoelectric ceramic reed element mounted to chop the radiation at a precise, fixed frequency prior to impingement on the element. The piezo ceramic device forms part of a resonant circuit in which the device serves as an active element in a phase locked loop arrangement used to drive and stabilize the chopper.

The piezo ceramic device deflects under applied voltage and generates its own signal which is used to lock the circuit onto the resonant frequency of the device. The circuit, while shown in connection with an optical chopper may be used for other applications where stable operating frequencies are required.

DETAILED DESCRIPTION OF THE PREFERRED EMBODIMENTS

Figure 1:
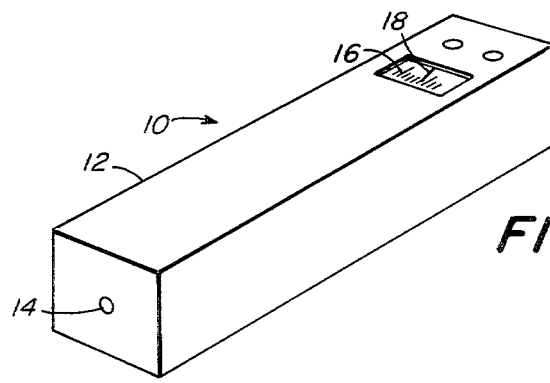
FIG. 1 is a view in perspective of an instrument made according to the invention for making remote temperature readings.

In FIG. 1, the invention is embodied in the form of a small, light weight, portable thermometer 10 adapted to remotely read the temperature of an object, and, as a practical application thereof, may be used as a clincal thermometer for taking the temperature of a patient without making physical contact with the patient. The thermometer 10 of FIG. 1 is comprised of a housing 12 at one end of which is formed an aperture 14 which is aimed at the patient or other object. If the subject is a patient, the device typically is directed towards the mouth of the patient, or if desired some other part of the body where a temperature abnormality is suspected. At the opposite end of the housing 12 in the top wall thereof, is a gauge 16 provided with a movable needle which moves across the gauge face to indicate the temperature measured by the instrument. Other types of readout devices such as digital displays may be utilized in place of the gauge shown.

Figure 2:
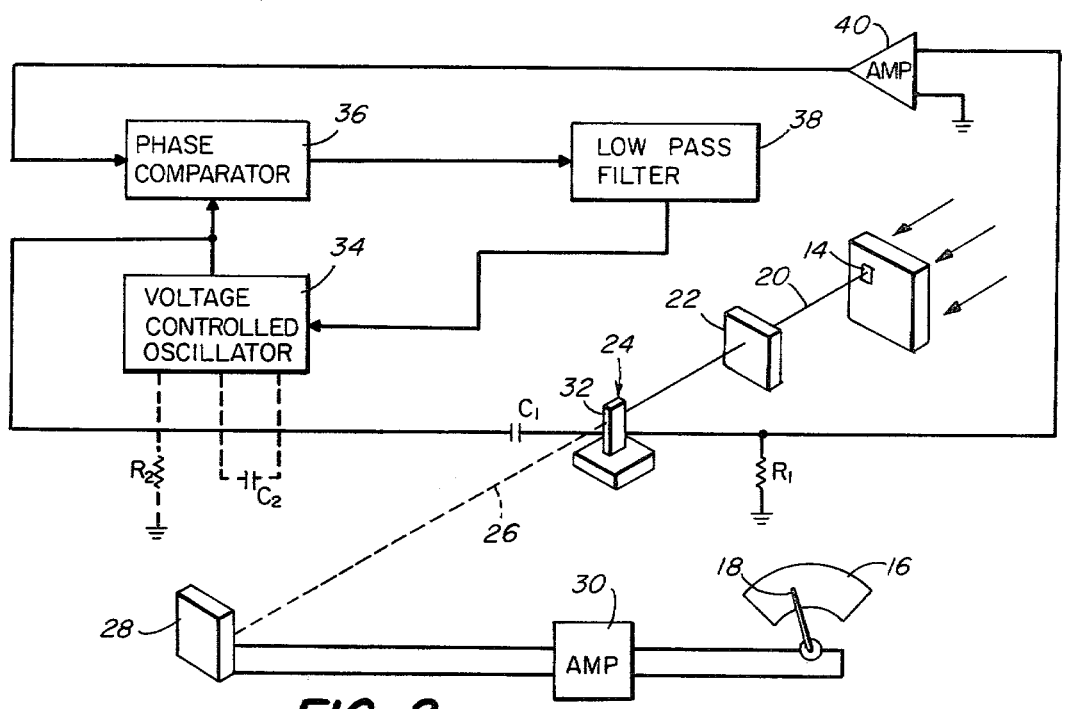
FIG. 2 is a schematic diagram of the invention.

Referring now to FIG. 2, there is illustrated in schematic form the primary operating components of the instrument and their interrelationships. As shown, infrared energy from the patient, etc., passes through the aperture 14 as a steady beam 20 and through a filter 22 before passing through a modulator or chopper 24 where the steady beam 20 is converted to a pulsed beam 26 prior to impingement upon an infrared detector 28. The detector 28 converts the pulsed IR energy 26 into pulsed electrical energy, which is amplified at 30 and processed through analog circuits to drive the display meter 16. The conversion of the steady state IR energy to a pulsed state avoids DC drift which might otherwise occur. The IR sensor 28 may be one of various devices adapted to convert IR energy to electrical energy, but, a thin lead sulfide device has provided satisfactory results.

Figure 3:
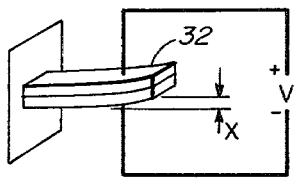
FIGS. 3, 4, and 5 are prespective views schematically illustrating the behavior of a piezo electric element in response to an applied DC voltage.
Figure 4:
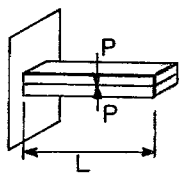
Figure 5:
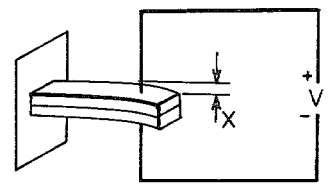

The modulator 24 according to the present invention is a piezoelectric ceramic device in the form of a reed which deflects physically when a DC voltage is applied thereto. In FIGS. 3, 4, and 5 there is illustrated the behavior of the piezoelectric ceramic reed when a DC voltage is applied to it. In FIG. 3 the device deflects or is bent upwardly when a positive voltage is applied to the upper half of the reed with a negative voltage being applied to the lower half thereof. In FIG. 4 the reed is shown at rest when no voltage is applied to it, while in FIG. 5 the reed is bent downwardly when a negative voltage is applied to the upper half and a positive voltage applied to the lower half. In FIGS. 3, 4, and 5 X indicates the displacement of the device due to bending action thereof when subjected to the voltage, P indicates the direction of the polarization, V indicates the voltage applied and L indicates the length of the piezoceramic reed element.

A piezoceramic reed 32 of the sort used in the present invention has certain inherent properties. In the practice of the present invention, a reed of appropriate dimensions is selected so that its natural resonant frequency of one quarter wave length or a multiple of one quarter wave length falls into the audio frequency range of 40 to 600 hertz. This type of piezoelectric ceramic material is classified as a "motor" or "bender" implying that a mechanical motion is produced as a result of applying an electric potential. These materials will also produce the reverse effect by generating a voltage as a result of mechanical deformation, although the choice may not be optimized for both with one material. The latter are called "generators". If a pulsed voltage is applied to such a reed, it will deflect in the manner of the FIGS. 3, 4, and 5 and vibrate at a steady amplitude. Chemically these materials are identified as titinates or zirconates of lead or barium.

In the system of FIG. 2, there is illustrated a circuit adapted to drive the reed 32 at its resonant point and hold it there under normal operating conditions such as typically might be found if the circuit were incorporated in a medical temperature sensing instrument, for example. The illustrated circuit not only is characterized by an inherent ability to search out the resonant frequency of the reed, but to lock itself on that frequency once it is established.

In the circuit of FIG. 2 the piezoelectric reed element 32 forms an integral, active part of the circuit in addition to providing chopper functions for the IR energy directed against the sensor 28. The circuit is comprised of a voltage controlled oscillator 34 which provides the driving signals to the piezoceramic reed 32 and also provides an error signal to a phase comparator 36. A low pass filter 38 receives the output of the phase comparator and provides an input to the VCO 34. An amplifier and low pass filter 40 serves to amplify the reference output signal of the reed 32 and return it to the phase comparator signal input 36. The circuit is adapted to supply its own reference frequency as well as a phase shifted error signal. These two signals are applied to the phase comparator.

Figure 6:
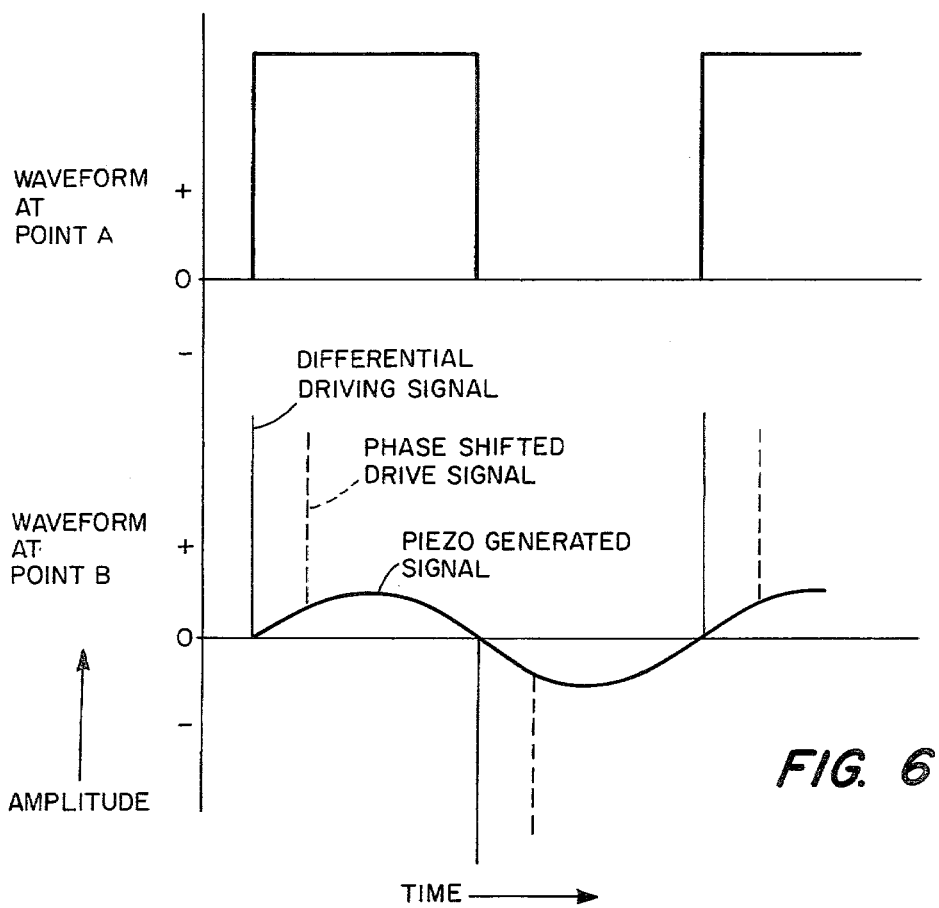
FIG. 6 illustrates the wave forms in the circuit at different points thereof, and, FIG. 7 is a view in perspective showing a modification of the invention.

The normal, free running frequency of the VCO 34 is set approximately close to the fundamental resonant frequency of the piezo reed element 32. This is a square wave with a 50% duty cycle at the output of the VCO at point A. The same wave form appears on both sides of a capacitor C 1. This capacitor is electrically in series with the reed 32, which itself appears as a capacitor due to its metal-ceramic-metal sandwich configuration. Both capacitors in conjunction with a resistor R 1 act as a differentiating network for the applied square wave resulting in a positive and negative spike appearing at point B. These spikes represent the driving impulses that cause the piezo element to bend physically in a near sinusoidal manner and create a usable displacement at the free end of the reed to provide the optical chopping of the beam 20. Point B, however, indicates that there is an additional waveform present that occurs between the positive and negative spikes and, at resonance, this waveform approximates a sine wave connecting to the spikes on the positive and negative excursions. The source of this second waveform is the piezo element 32 generating its own output voltage as a result of its bending. This generator effect produces a low voltage measurable output and is not masked by the driving signal, because the driving signal is AC coupled to the piezo element and differentiated at point B. These waveforms are illustrated in FIG. 6.

The output signal generated by the piezo element 32, after amplification at 40, is used as a signal source and phase compared with its driving signal in a phase locked loop configuration. Employing a phase comparator that operates in quadrature, 90° between its two inputs, and applying the piezo generator signal to its input, the piezo element 32 will be driven towards its resonant frequency until phase lock occurs. If the center frequency of the voltage controlled oscillator is set near the resonant frequency of the reed, it will shift in response to the phase error voltage produced by the low pass loop filter. Phase dynamics of the system will drive the reed to resonance whether the free running frequency of the VCO is above or below the resonant frequency.

The self seeking and locking features make this piezo element and circuit very useful as a radiation modulator or other device operating in the audio frequency range where a stable locking state is rapidly achieved. The circuit has a minimum number of components and tolerances may be low. In addition, resonance stability is achieved without temperature compensation, expensive crystals, mixing or dividing circuits.

Figure 7:
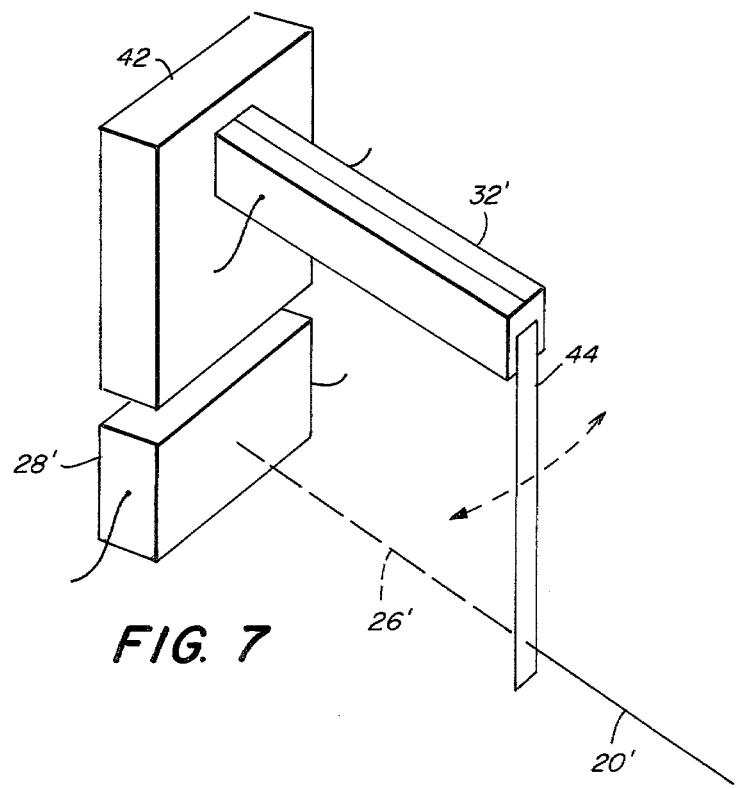

Referring now to FIG. 7 of the drawings, there is illustrated a modification of the invention and, in this embodiment, instead of the reed 32 being disposed directly along the optical path of the beam, a reed 32' is mounted on a fixed support 42 at one end and at the opposite free end carries a stiff, lightweight, optically dense shield 44. The shield 44 is attached to the free end of the reed 32' and extends across the optical path of the beam 20' to interrupt the beam and chop it prior to impingement against a radiation sensor 28'. When the reed 32' is subjected to a pulsed signal, it will vibrate in the manner described above and the shield 44 will oscillate across the optical path to chop the beam 20'. The offset configuration provided by the shield on the reed allows more flexible and convenient arrangements for the components of the optical system. The addition of the shield will add some mass to the reed which will result in some shift of its resonant frequency in a slightly downward direction.

The values of the resistor and capacitor in the circuit must be low enough to differentiate the driving signal from the self generated signals of the element. Typically C 1 may have a value of 0.1 to 0.2 MFD. The amplifier 40 should have low pass characteristics in order to eliminate spikes from passing on to the comparator 36. The comparator 36 sees only the signals generated by the piezo element, otherwise the spikes, if passed, will make the circuit unstable and prevent the desired phase locking action from occuring. Thus, it is important to separate the driving signals clearly from those signals generated by the piezo element. The function of the capacitor C 1 is to provide DC isolation for the piezo element itself.

While the circuit has been disclosed with particular reference to its use in conjunction with a temperature measuring instrument, its phase locking characteristics make it attractive for use in other circuits where a stable modulating circuit is desired. The piezoelectric element is, however, particularly useful in the thermometer instrument of the sort disclosed in view of its low power requirements, stability, simplicity and low cost. It makes very practical battery-operated, handheld temperature measuring instrument of quick, reliable performance. In practice a person's temperature may be measured almost immediately since the response time of the instrument is on the order of a few milliseconds. There are no rotating or mechanical parts and the system is fabricated entirely from solid state components using only micro watts of power at low voltages, typically 15 v or less. Operating performance of the unit in an instrument designed to operate in the range of 85° to 105° F. included resolution on the order of 0.2° F.

Having thus described the invention, what I claim and desire to obtain by Letters Patents of the United States is:

1. An instrument for measuring the temperature of an object by means of the infrared radiation emitted therefrom, comprising
    (a) a radiation detector adapted to generate an electrical output in response to radiation impinging thereon,
    (b) means for forming and directing a beam of radiation against said detector,
    (c) temperature indicating means connected to said detector for converting the electrical output of said detector into a display representative of the temperature of said object,
    (d) beam modulating means disposed in the path of said beam for converting said beam into a series of pulses when vibrated in and out of said path,
    (e) said modulating means including a piezoelectric reed element adapted to vibrate when subjected to driving signals at a frequency related to the resonant frequency of said element, and,
    (f) phase locked loop oscillator circuit means connected to said reed element for operating said reed,
    (g) said element adapted to generate a reference signal when vibrated whereby said reference signal functions to lock said circuit means at the resonant frequency of said element.

2. An instrument according to claim 1 wherein said circuit means includes a voltage controlled oscillator, a phase comparator receiving signals from said oscillator and from said element and a low pass filter receiving an output of said comparator and providing an input to said oscillator.

3. An instrument according to claim 1 wherein said element is dimensioned so as to have a resonant frequency for one quarter wavelength and multiples thereof in the range of 40 to 600 hertz.

4. An instrument according to claim 1 wherein said element is disposed directly in the path of said beam and moves in and out of said path when vibrated.

5. An instrument according to claim 1 wherein said element is offset from the path of said beam and a shield is mounted at the free end of said element and extends across said path, said shield being adapted to move in and out of said path when said element is vibrated.

6. A resonant circuit, comprising
    (a) a piezoelectric element adapted to vibrate when subjected to driving signals at a frequency related to the resonant frequency of said element, and
    (b) phase locked loop oscillator circuit means connected to said element for operating said element at its resonant frequency,
    (c) said circuit means including a voltage controlled oscillator, a phase comparator receiving signals from said oscillator and from said element and a filter receiving an output from said comparator and providing an input to said oscillator.

* * * * *